United States Patent Office 3,530,294
Patented Sept. 22, 1970

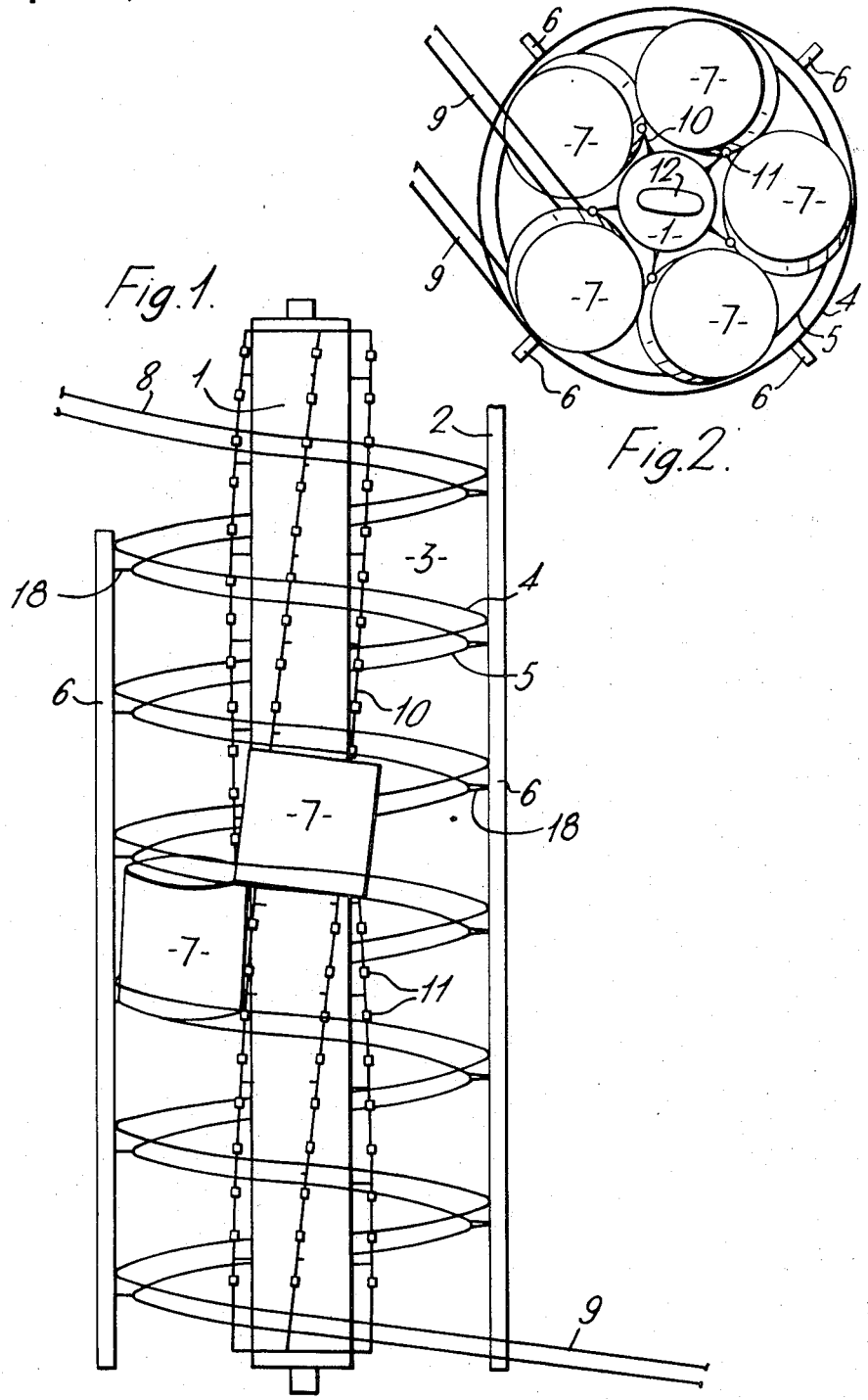

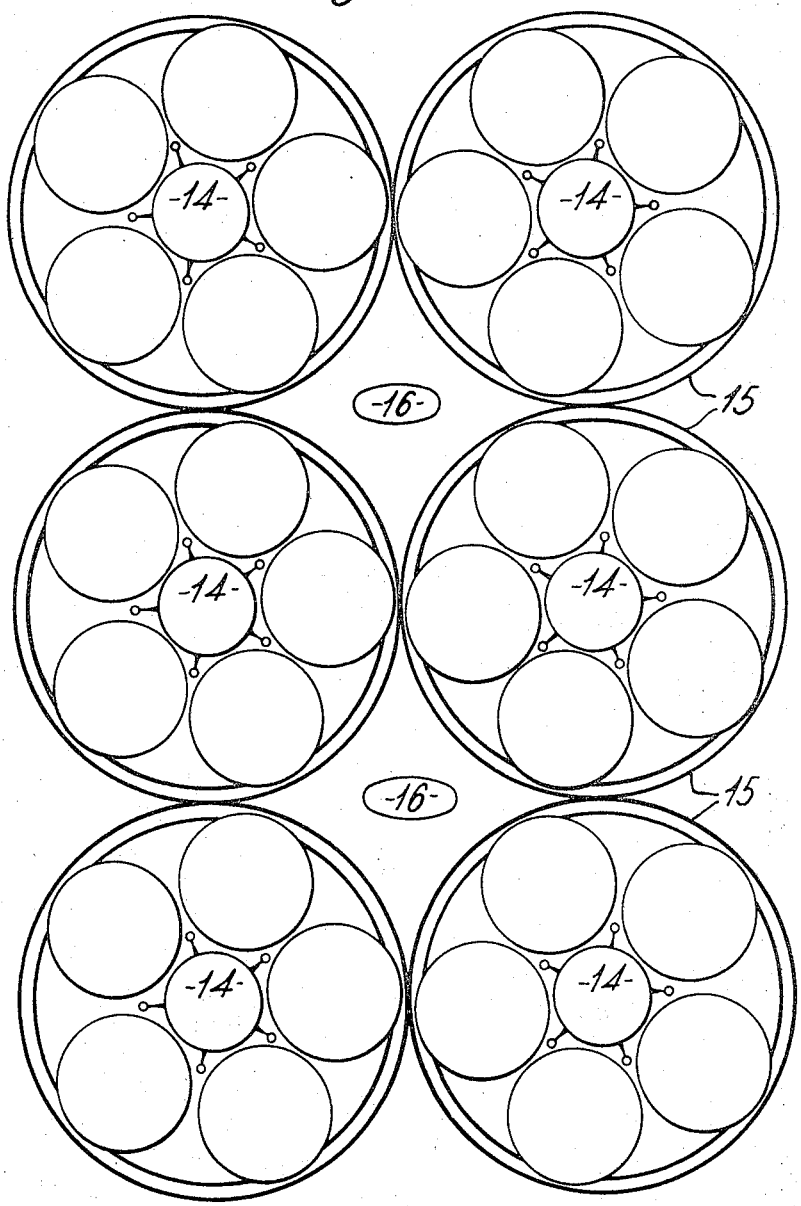

3,530,294
APPARATUS FOR IRRADIATING ARTICLES MOVING ALONG A HELICAL TRACKWAY
Frank Rogers, Longworth, England, assignor to United Kingdom Atomic Energy Authority, London, England
Filed Apr. 21, 1966, Ser. No. 544,155
Claims priority, application Great Britain, Apr. 26, 1965, 17,562/65
Int. Cl. G01n 21/00, 23/20
U.S. Cl. 250—52
8 Claims

ABSTRACT OF THE DISCLOSURE

Apparatus for irradiating articles with a source of radiation comprising a longitudinal member surrounded by guide structure which defines a helical trackway. At least part of the trackway is disposed within the field of radiation from the source. Means associated with the longitudinal member cooperate with the articles to be irradiated such that when the longitudinal member is rotated the articles are rolled along the trackway and are subjected to irradiation from the source.

---

This invention relates to gamma irradiation apparatus and is particularly but not exclusively concerned with apparatus suitable for the irradiation of circular cylindrical articles for example drum-like containers holding materials for irradiation processing.

Known forms of irradiation apparatus employ a plate like source of gamma radiation and irradiate arrays of continuously moving packages or containers holding material to be irradiated within zones on each face of the source. A mechanism of the known kind for traversing packages backwards and forwards at successive levels within the zones can tend to become complicated, particularly since limitations are imposed on the design by the radiation received by the equipment, for example lubrication is a difficulty and since the whole must be enclosed in a massive and costly biological shield, space is at a premium.

An object of the present invention is to provide a relatively simple apparatus for conveying packages past a source of radiation in such a manner that each package receives a controlled uniform dose of radiation.

To this end according to the invention apparatus for irradiating cylindrical articles with a source of gamma radiation comprises a vertical member located within the field of radiation from the source, a guide structure surrounding the member to define, in association with the member, a helical passageway for the articles and means for rotating the vertical member relative to the guide structure whereby an article is rolled around the vertical member and along the passageway.

Preferably the vertical member is hollow and encloses the radiation source. The vertical member may be provided with radially projecting elements to support and guide the articles.

Each element may be formed as a helix on said vertical member and may be provided with a plurality of rollers to engage the articles.

In a preferred form of the apparatus means are provided to supply articles to be irradiated to the top of the guide structure and to remove articles from the bottom after irradiation.

To enable the nature of the invention to be more readily understood embodiments of the invention will now be described by way of example with reference to the accompanying drawings.

In the drawings:

FIG. 1 is a diagrammatic elevation of a gamma radiation source and a drum support and guide arrangement FIG. 2 is a plan view of the arrangement shown in FIG. 1

FIG. 3 is a plan view of an arrangement using multiple radiation sources.

Referring to FIGS. 1 and 2 an apparatus for irradiating materials held in drum like containers comprises a vertical rotatable member 1 and a drum guide structure 2 which surrounds the member to define a helical passageway 3 for the drums around the member 1. The guide structure is formed by two curved rails 4 and 5 supported on a frame 6. Rail 5 provides the vertical support and rail 4 provides radial constraint for drums 7. Rail 5 is located below and radially inwardly of rail 4, and thus, struts 18 are provided to connect the rail 5 to the frame 6. Of course the arrangement may extend in directions other than the vertical direction in which case the member 1 would be more properly referred to as a longitudinal member extending in a longitudinal direction.

The drums 7 containing material for irradiation processing, for example material to be sterilised, are fed to the top of the guide structure on rails 8 and removed from the bottom of the structure after irradiation on rails 9.

The rotatable vertical member 1 is axially located relative to the helical passageway and is provided with radial projecting elements 10 to support and guide the drums. Each element is formed as a helix on the member 1 and includes a plurality of small diameter rollers 11 to engage the drums.

The central rotatable member 1 is driven by conventional methods from an electric motor (not shown) preferably located outside the radiation field for example, outside the biological shield which necessarily surrounds the apparatus.

The member 1 is hollow and a radiation source 12 is enclosed within the member. The source 12 is fixed in position and does not rotate with member 1. It will be appreciated that the source need not be located centrally relative to the apparatus but can be located outside the guide structure 2 and one such arrangement will be hereinafter described.

During operation of the apparatus a plurality of drums 7 containing material to be irradiated are supplied in continuous succession to the top of the guide structure 2 on rails 8. The central vertical member rotates at a uniform speed and the elements 10 with rollers 11 engage each drum in turn guiding the drum along the curved rails 4 and 5. The drum follows a helical path rolling around member 1 and turning around its own axis. With the centrally located source, the rotation of the drum ensures an acceptably uniform dose of radiation is given to the contents of the drum and all drums receive substantially similar amounts of radiation.

By suitable arrangement of the helical pitch of guide elements 10 the drums can be made to assume a position corresponding to pitch of the guide structure rails 4 and 5 and thus minimise the spacing between adjacent drums.

For efficient utilisation of the source each drum space within the helical passageway 3 should be occupied but the apparatus may if desired, be fed intermittently, thus producing empty spaces, without operating difficulty.

The number of drums disposed around the helical passageway 3 at any cross section may be varied. Five drums 7 are shown in FIG. 2 and this number provides a convenient locating space for the source together with an acceptable efficient use of the source.

The most convenient diameter of the drum may be determined, by methods well known in the art, from the density of the material to be irradiated and the acceptable ratio of maximum to minimum dose to be delivered. The height of each drum may conveniently be approximately equal to the diameter but considerable variation from this is possible.

Alternative forms of guide rails may be used for example a single guide track in the form of a conventional angle iron member suitably curved has proved successful.

FIG. 3 illustrates an alternative form of apparatus in which a number of vertical members 14 and thus associated guide structures 15 are disposed around a plurality of radioactive sources 16. In this instance the speeds of the individual rotating member can be adjusted to give the same total dose of radiation to drums in all of the helical passageways or to give different doses to drums in each arrangement. It will be clear that many variations are possible using apparatus in accordance with the invention and the foregoing examples should not be considered limiting.

It will also be realised that the invention has been described in relation to drum-like containers but that the invention is applicable to other articles of right cylindrical form.

I claim:

1. Apparatus for irradiating a cylindrical article with a source of radiation comprising, a longitudinal member, a guide structure surrounding at least part of said longitudinal member and defining a helical trackway, said trackway extending longitudinally with respect to said longitudinal member and at least part of said trackway being within the field of radiation from the said source, means to rotate said longitudinal member, and means operatively associated with said longitudinal member and arranged to cooperate with said article to be irradiated so that upon rotation of said longitudinal member, said article rolls along said trackway.

2. Apparatus according to claim 1 wherein the guide structure comprises a curved track supported on a framework.

3. Apparatus according to claim 2 wherein said track comprises a pair of curved rails a first rail arranged to support the articles longitudinally and the second rail located to radially restrain the articles.

4. Apparatus according to claim 1 wherein the longitudinal member is hollow and surrounds the radiation source.

5. Apparatus according to claim 1 wherein the means operatively associated with said longitudinal member and which is arranged to cooperate with said articles to be irradiated comprises radially projecting guide elements.

6. Apparatus according to claim 5 wherein the guide elements are helically arranged around the longitudinal member.

7. Apparatus according to claim 6 wherein the projecting elements comprise a plurality of small diameter rollers.

8. Gamma irradiation apparatus for treating circular cylindrical articles comprising a source of gamma radiation, a helical track, said track having its axis vertical and within the field of rotation from the source, a member axially located and rotative relative to the track, elements projecting from said member to engage and support articles on the track and means to supply articles for irradiation to the top of said helical track and remove articles from the bottom after irradiation.

References Cited

UNITED STATES PATENTS

| 2,282,024 | 5/1942 | Bitner | 250—48 |
| 2,885,557 | 5/1959 | Kizauer | 250—52 |

RALPH G. NILSON, Primary Examiner

A. L. BIRCH, Assistant Examiner